A. G. PARKER.
Corn-Planter.
No. 36,020.
Patented July 29, 1862.
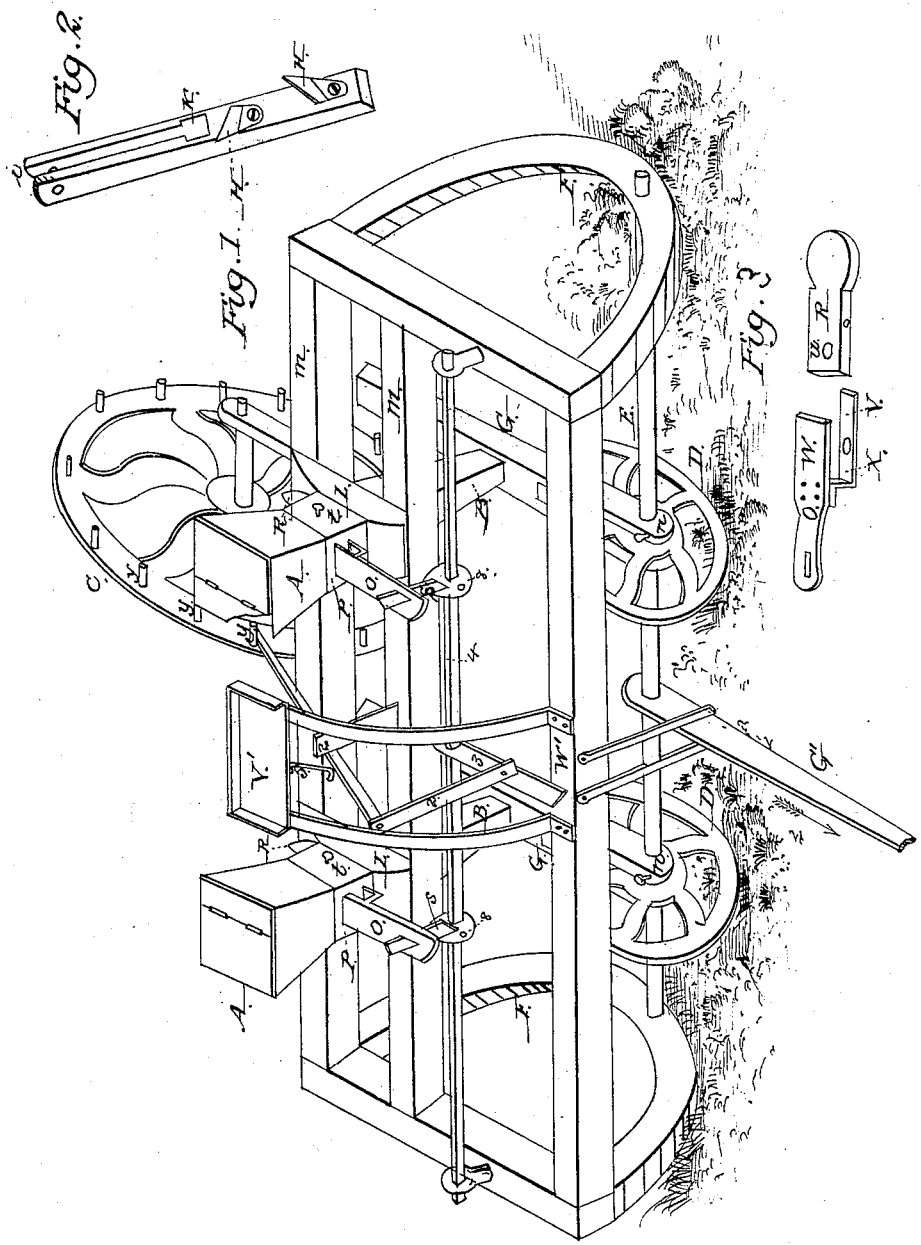
Witnesses:
Wm Baker
John Osburn
Inventor:
Alfred G Parker

UNITED STATES PATENT OFFICE.

ALFRED G. PARKER, OF NORTH GAGE, NEW YORK.

IMPROVEMENT IN CORN-PLANTERS.

Specification forming part of Letters Patent No. 36,020, dated July 29, 1862.

*To all whom it may concern:*

Be it known that I, ALFRED G. PARKER, of North Gage, in the county of Oneida and State of New York, have invented a new and useful Improvement on the Adjustable Corn-Planter; and I do hereby declare that the following is a full, clear, and exact description of the construction and operation of the same, reference being had to the annexed drawings, making a part of this specification, in which—

Figure 1 is a perspective elevation of the entire machine. Figs. 2, 3, and 4 are separate parts of the same, and not distinctly shown in the main drawing.

The seed to be planted is placed in the hoppers A A, Fig. 1, and is delivered at the mouth of the spouts B B.

The machine stands and moves upon the three wheels C and D D, the two latter marking the rows by their track in the soil. They are loosely fixed on the revolving shaft E, which has its bearings in the foot of the stirrups F F.

The drag-shafts G G are for covering the corn after being dropped, and they have suitable hoe-blades affixed on their bottoms for this purpose. Fig. 2 exhibits one of these shafts with the reverse side turned up, disclosing the hoe-blades H H. These blades are so placed on the under side of the shaft that one of them passes on one side of the trench in which the corn is dropped and the other on the other side, each dragging the soil inward and covering the corn. The shaft is divided at the upper end, as is shown at *i*, Fig. 2, and the marking-wheels D D, Fig. 1, are hung upon their shaft within the slot making this division, so that the trench in which the corn is to be dropped will be under the center of the shafts G G, respectively. The square orifice *k*, Fig. 2, denotes the place through which the corn is dropped, the spouts B, Fig. 1, hanging loosely at their lower ends in these orifices.

The hoppers A and the wheels D are adjustable as to their distance apart, and it is by this means the width between the rows is regulated. The hoppers rest by their bases L L on the bars *m m* of the frame, and are fixed where desired by a hook and staples to the back side of the frame. The shafts G and marking-wheels D are movable on the shaft E to correspond, and are fixed to their place on the shaft by a screw-pin, *n*, passing through the head of the shaft into a circular trench turned in the circumference of the shaft, there being several of these trenches sunk into the shaft for that purpose. The screw-pin is not driven home so as to prevent the revolving of the shaft, but only sufficient to prevent the lateral movement of the shaft and wheel.

The dropping of the corn from the hoppers A in separate hills and at proper distances is effected by the use of the devices shown in Figs. 3 and 4, operating in the chambers P P at the bottom of the hoppers A, Fig. 1.

The double-lipped slide O, Fig. 3, is seen at O, Fig. 1, and the stationary guard R, Fig. 4, is seen at R, Fig. 1, the latter entering the chamber P from the rear, and is fixed there by the set-pin *t*, and the former entering the same chamber from the front, straddling the guard R within the chamber and sliding to and fro as each successive hill is dropped while the machine is in operation. When the agent O, Fig. 3, is withdrawn the orifice U is uncovered within the hopper, but the lip V, Fig. 3, making a bottom thereto, forms a chamber or measure for the seed for one hill, and this measure is filled by the seed from the hopper. When the slide O, Fig. 3, returns, the lip W cuts off the supply from the hopper, and the orifice X coming under the chamber U, Fig. 4, the contents of the latter are allowed to fall and a hill is dropped. Each supply of seed thus dropped falls through the spouts B, Fig. 1, from each hopper into the trenches in the soil formed, as beofre described, by the passage of the marking-wheels D D as the machine is drawn forward, thus dropping and covering, as before mentioned, two rows by the same movement. This movement of the slide, Fig. 3, is effected by the pins Y, projecting from the rim of the wheel C, tripping the outer end of the lever Z, by which means, through the agency of the connecting-levers 2 and 3, the loose shaft 4 is rocked slightly, by means of which the slide O is thrown out and in, as aforesaid, by the standard S, attached to the shaft 4, as shown in the figure.

The nut 8, by which the standard S is connected with the shaft 4, is capable of being moved laterally on this shaft to correspond with the position of the hopper, and is then fixed to its place by a set-screw. The pins Y on the rim of the wheel C are movable in their orifices, and being slightly headed at each end may each alternate one be driven back so as not to hit the lever Z in the passage of the wheel, thus increasing the space between the hills in planting, if desired; or, to make these pins more secure and to prevent their moving back and forth, they may be screwed into the wheel-rim, and in such case, instead of pressing them back out of the way, as described, those intended to be removed are taken out and screwed in again on the back side for safe keeping. The loose hook 5 is designed to be used when the machine is driven without planting. The outer end of the lever Z is raised and allowed to rest upon this hook. This depresses the end coming in contact with the pins Y, and the machine moves off without operating.

In turning round at the ends of the rows the driver occupying the seat V' rises upon his feet, standing on the beam W' of the frame, his weight raising the rear part of the machine from the ground, and the machine turns upon the wheels D.

The machine is designed to be drawn by horses attached in the usual manner to the tongue G'.

I do not claim as new any of the above-described parts when used separately, as they have been used before; but

What I claim as my invention, and desire to secure by Letters Patent, is—

1. The combination of the adjustable furrow-wheels D and drag-bars G with the movable seed-boxes A, when constructed and arranged in the manner and for the purpose set forth.

2. The combination of the wheel C, provided with the movable pins Y, with the levers Z 2 3, rock-shaft 4, and movable arm S, when the whole are constructed and arranged in the manner and for the purpose set forth.

ALFRED G. PARKER.

Witnesses:
WILLIAM BAKER,
DEXTER GILLMORE.